United States Patent
Cairns et al.

(10) Patent No.: US 8,295,417 B2
(45) Date of Patent: Oct. 23, 2012

(54) METHOD AND APPARATUS FOR EFFICIENT ESTIMATION OF INTERFERENCE IN A WIRELESS RECEIVER

(75) Inventors: Douglas A. Cairns, Durham, NC (US);
Gregory E. Bottomley, Cary, NC (US);
Andreas Cedergren, Bjärred (SE);
Tracy L. Fulghum, Durham, NC (US);
Elias Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1168 days.

(21) Appl. No.: 12/133,636

(22) Filed: Jun. 5, 2008

(65) Prior Publication Data
US 2009/0304132 A1 Dec. 10, 2009

(51) Int. Cl.
*H04B 7/10* (2006.01)
(52) U.S. Cl. ........ 375/347; 375/346; 375/316; 375/260; 375/348
(58) Field of Classification Search .......... 375/347, 375/346, 316, 260, 349, 348; 455/67, 562, 455/115, 278
See application file for complete search history.

(56) References Cited

U.S. PATENT DOCUMENTS

| | | | |
|---|---|---|---|
| 6,683,924 B1 | 1/2004 | Ottosson et al. | |
| 2005/0047485 A1 | 3/2005 | Khayrallah et al. | |
| 2005/0201447 A1 | 9/2005 | Cairns et al. | |
| 2006/0072654 A1* | 4/2006 | Nielsen | 375/148 |
| 2006/0268962 A1* | 11/2006 | Cairns et al. | 375/148 |
| 2008/0002759 A1 | 1/2008 | Cairns et al. | |

FOREIGN PATENT DOCUMENTS

WO 2008/000367 A1 1/2008

OTHER PUBLICATIONS

Kutz, G. et al. "Sparse Chip Equalizer for DS-CDMA Downlink Receivers." IEEE Communications Letters, vol. 9, No. 1, Jan. 2005, pp. 10-12.

* cited by examiner

*Primary Examiner* — Zewdu Kassa
(74) *Attorney, Agent, or Firm* — Coats & Bennett, P.L.L.C.

(57) ABSTRACT

Methods and apparatus for determining an impairment covariance matrix for use in an interference-suppressing CDMA receiver are disclosed. In several of the disclosed embodiments, precise information regarding signal propagation delays is not needed. An exemplary method includes the selection of a plurality of processing delays for processing a received CDMA signal. Net channel coefficients for the processing delays are estimated and used to calculate an impairment covariance matrix. The impairment covariance matrix is calculated as a function of the estimated net channel coefficients and the processing delays, without estimating a propagation medium channel response for the received signal.

22 Claims, 4 Drawing Sheets

METHOD AND APPARATUS FOR EFFICIENT ESTIMATION OF INTERFERENCE IN A WIRELESS RECEIVER

TECHNICAL FIELD

The present invention generally relates to wireless communication systems, and particularly relates to the estimation of signal impairments in Code-Division Multiple Access (CDMA) receivers.

BACKGROUND

Suppression of interference at the wireless receiver is an important component of current and developing communication systems. Interference cancellation performance affects transmission power requirements and link utilization efficiencies in both the uplinks and downlinks of wireless communication systems, such as cellular communication networks based on the Wideband Code Division Multiple Access (WCDMA) or IS-2000 standards. Better interference cancellation enables data transmission at lower power levels and/or at higher data rates than would otherwise be possible.

The particulars of interference cancellation vary as a function of many variables, such as the communication signal types and protocols involved, details of the transmitting and receiving equipment, etc. However, providing good interference cancellation performance generally requires significant signal processing resources, because of the need to characterize and suppress received signal interference in real time.

For example, the well known generalized Rake (G-Rake) receiver uses extra de-spreading fingers to suppress interference and improve demodulation. Impairment cross-correlations between the fingers can be represented as an impairment covariance matrix $R_u$; that matrix in turn can be used to generate the combining weights used by the G-Rake receiver in combining de-spread data values. By computing the combining weight vector, w, as:

$$w = R_u^{-1} h, \quad \text{Eq. (1)}$$

the G-Rake receiver uses the impairment covariance matrix to whiten colored interference in the received signal(s) of interest. In the above expression, h is the net channel response vector; each element of h represents the overall propagation channel response between a signal transmitter and a receiver finger, including the radio channel as well as the transmitter and receiver pulse-shaping filters.

There are several approaches for generating $R_u$ in the G-Rake context. For example, the parametric G-Rake receiver models the impairments as a sum or combination of different interference contributions, including contributions from own-cell interference, white noise, and other-cell interference. With this parametric model, and assuming the reception of signals from J+1 network base stations, the impairment covariance matrix is given by:

$$R_u = E_c R_I + N_0 R_n + \sum_{j=1}^{J} E_c^j R_O^j, \quad \text{Eq. (2)}$$

$$= N_0 R_n + \sum_{j=0}^{J} E_c^j R_O^j - hh^H$$

where $E_c$ is the average energy transmitted per chip of own-cell base station, $N_0$ is the one-sided power spectral density of white noise, $E_c^j$ is the average energy transmitted per chip by the j-th other-cell base station, $R_I$ is a covariance matrix modeling own-cell interference, $R_n$ models white noise passed through pulse shaping filter, and $R_O^j$ is a covariance matrix modeling other-cell interference from the j-th other cell. Those skilled in the art will appreciate that the second formulation of Eq. (2) demonstrates that the own-cell interference term can be computed in a fashion similar to that used for other-cell interference, provided that a benign signal term is subtracted—e.g., $R_I = R_O^0 - hh^H$.

In practical receiver implementations where other-cell interference is not explicitly modeled, i.e., where other-cell interference $R_O^j$ is modeled as white noise, the computation of $R_I$ contributes significantly to the overall complexity of a parametric G-Rake receiver operation. In other words, improving the efficiency of the computation of $R_I$ reduces the signal-processing complexity of a parametric G-Rake receiver, freeing computation resources for other receiver tasks. In receivers where other-cell interference ($R_O^j$) is explicitly modeled, the calculation of the other-cell interference matrices similarly affects the complexity of the receiver. Improving the efficiency of these calculations is thus similarly advantageous.

One approach for calculating entries $R_I(d_1, d_2)$ for $R_I$ is based on the equation:

$$R_I(d_1, d_2) = \sum_{l=0}^{L-1} \sum_{q=0}^{L-1} g_l g_q^* \sum_{\substack{m=-\infty \\ m \neq 0}}^{m=\infty} R_p(d_1 - mT_c - \tau_l) R_p^*(d_2 - mT_c - \tau_q), \quad \text{Eq. (3)}$$

where $g_l$ represents the l-th medium channel coefficient, $d_k$ is the k-th finger delay, $\tau_j$ is the j-th channel delay, $T_c$ is a CDMA chip duration, and $R_p(*)$ is the autocorrelation of the receive pulse shaping filter. (Note that if the transmit and receive pulse filters are not the same, then $R_p(*)$ includes convolution of the transmit and receive pulse filters.) The medium channel coefficients $g_l$ represent the response of the radio channel alone, unlike net channel coefficients, which include the response of the transmit and receive filters.

Eq. (3) may be shown to be equivalent to:

$$R_I(d_1, d_2) = \sum_{l=0}^{L-1} \sum_{q=0}^{L-1} g_l g_q^* [R_{pp}(\Delta_1 - \Delta_2) - R_p(\Delta_1) R_p^*(\Delta_2)], \quad \text{Eq. (4)}$$

where $\Delta_1 = d_1 - \tau_l$ and $\Delta_2 = d_2 - \tau_q$, and $$R_{pp}(\Delta_1 - \Delta_2) = \sum_{m=-\infty}^{\infty} R_p(\Delta_1 - mT_c) R_p^*(\Delta_2 - mT_c).$$

$R_{pp}(*)$ can be pre-computed, thereby saving run-time computations, such that the signal processing implementation of Eq. (4) reduces to a few table lookups and a multiplication. However, the table lookup for $R_{pp}(*)$ is somewhat complicated because it depends not only on the difference between $\Delta_1$ and $\Delta_2$, but also at what sample phase the difference occurs. Also, because $R_{pp}(*)$ is not symmetric, one must also account for positive and negative delay differences in selecting lookup table entries.

Because of the above complications, the required table lookup operations depend on a greater number of variables, meaning more processing decisions have to be made to identify proper table entries, which in turn requires greater processing power or speed and a greater amount of working memory. Such complications detract from the efficiency gains otherwise afforded by the implementation of Eq. (4) for $R_I$ computation in a parametric G-Rake receiver.

Another approach expresses $R_I$ as:

$$R_I(d_1, d_2) = \sum_{l=0}^{L-1}\sum_{q=0}^{L-1} g_l g_q^* \left[ R(n_1, n_2) - \frac{1}{N^2} \sum_{m=1-N}^{N-1} (N - |m|) R_p(d_1 - mT_c - \tau_l) R_p^*(d_2 - mT_c - \tau_q) \right]. \quad \text{Eq. (5)}$$

Eq. (5) has similarities to the formulation given in Eq. (4), with $R(n_1, n_2)$ equivalent to (and replacing) $R_{pp}(*)$, but includes a more complicated expression involving the sum of products of $R_p(*)$. Under limited reception conditions—i.e., minimal time dispersion in the propagation channel—the lookup tables for $R(n_1, n_2)$ and $R_p(*)$ need only span a few CDMA spreading chips to yield acceptable performance. However, Eq. (5) does not necessarily yield good performance over a range of channel conditions, and still entails significant computational complexity.

In a related U.S. patent application Ser. No. 11/479,483, titled "Method and Apparatus for Interference Estimation in a Generalized Rake Receiver" to D. Cairns and G. Bottomley (the "Cairns" application), the entire contents of which are incorporated by reference herein, another method for determining impairment correlations between a plurality of delays of interest for a received CDMA signal was disclosed. First, it was shown that the entries of the impairment covariance matrix given by Eq. (3) can be re-written as:

$$R_I(d_1, d_2) = \sum_{\substack{m=-\infty \\ m\neq 0}}^{\infty} \left( \sum_{\ell=0}^{L-1} g_\ell R_p(d_1 - mT_c - \tau_\ell) \right) \left( \sum_{q=0}^{L-1} g_q R_p(d_2 - mT_c - \tau_q) \right)^*. \quad \text{Eq. (6)}$$

If the first summation is modified to include the m=0 term, then Eq. (6) can be re-written as:

$$R_I(d_1, d_2) = \sum_{m=-\infty}^{\infty} \left( \sum_{\ell=0}^{L-1} g_\ell R_p(d_1 - mT_c - \tau_\ell) \right) \left( \sum_{q=0}^{L-1} g_q R_p(d_2 - mT_c - \tau_q) \right)^* - h(d_1)h(d_2)^*. \quad \text{Eq. (7)}$$

The right-most term, $h(d_1)h(d_2)^*$, is readily calculated from measured net channel response data. Efficient methods for calculating the remaining term were presented in the Cairns application, including time-domain convolution techniques (and the frequency-domain equivalents) for computing the impairment matrix terms.

Those skilled in the art will appreciate that each of the above impairment matrix formulations are written in terms of medium coefficients, i.e., g, which are the radio channel coefficients. In a practical receiver implementation, estimated medium coefficients are typically obtained by estimating the net coefficients, and then applying some variant of a transformation:

$$g = (B^H B)^{-1} B^H h, \quad \text{Eq. (8)}$$

where B is a conversion matrix. The (i,j) element of B is given by:

$$b_{i,j} = R_{TX/RX}(d_i - \tau_j). \quad \text{Eq. (9)}$$

Here, $R_{TX/RX}(\lambda)$ is the convolution of the transmit and receive filters evaluated at $\lambda$ ($d_i$ and $\tau_j$ were defined above in connection with Eq. (3)).

In practice, optimal performance of interference-suppressing receivers based on any of the above impairment estimation techniques may depend on precise knowledge of path delays ($\tau_j$) under some circumstances, especially when processing signals with a high signal-to-interference-plus-noise ratio (SINR). Inaccurate path delay information results in correspondingly inaccurate estimates of the medium response coefficients g. In some cases, an inaccurate estimate of the medium response may result in non-optimal receiver performance, even if the interference estimation process is very efficient.

SUMMARY

Methods and apparatus for determining an impairment covariance matrix for use in an interference-suppressing CDMA receiver are disclosed herein. According to several of the disclosed embodiments, an impairment covariance matrix for processing delays in a CDMA receiver may be computed without estimating a propagation medium channel response for the received signal. Thus, in several of these embodiments, precise information regarding the propagation delays and pulse shape autocorrelation functions is not needed for calculating an impairment covariance matrix.

In an exemplary embodiment of the methods disclosed herein, a plurality of processing delays for processing a received CDMA signal are selected. Net channel coefficients for the processing delays are estimated and used to calculate an impairment covariance matrix. The impairment covariance matrix is calculated as a function of the estimated net channel coefficients and the processing delays, again without estimating a propagation medium channel response for the received signal.

In some embodiments, the processing delays are selected so that the delay difference between any two of the processing delays is an integer multiple of a chip duration for the received CDMA signal. In other embodiments, processing delays with sub-chip spacing are selected if the CDMA signal is received through a flat or substantially flat propagation channel. In embodiments where processing delays are placed on a chip-spaced raster, the receiver processing circuits may be configured to calculate values for an interference function defined as a function of delay differences between processing delay pairs, over a range of delay differences at least equal to the maximum difference between any two of the processing delays. In these embodiments, calculating the impairment covariance matrix may comprise computing a matrix entry for a pair of processing delays as a function of the net channel coefficients for each of the pair and the interference function value corresponding to the delay difference between the pair. In some embodiments, it may be advantageous to calculate values for the interference function by executing a convolution operation in the time domain, or a corresponding operation in the frequency domain.

In general, the methods and apparatus taught herein for impairment correlation estimation may be used in essentially any type of wireless communication device or system involving CDMA signals. By way of non-limiting example, a parametric G-Rake circuit may be configured to estimate received signal impairment correlations using the methods described herein. The parametric G-Rake circuit may be applied advantageously to uplink signal processing, such as in a receiver at a wireless communication network base station, and/or to downlink signal processing, such as in a receiver at a wireless communication user equipment, terminal or handset. As another non-limiting example, a chip equalizer may be configured to estimate received signal impairment correlations using the techniques described herein.

Of course, the present invention is not limited to the above features and advantages. Indeed, those skilled in the art will recognize additional features and advantages upon reading the following detailed description, and upon viewing the accompanying drawings.

DETAILED DESCRIPTION OF EMBODIMENTS

Figure 1:
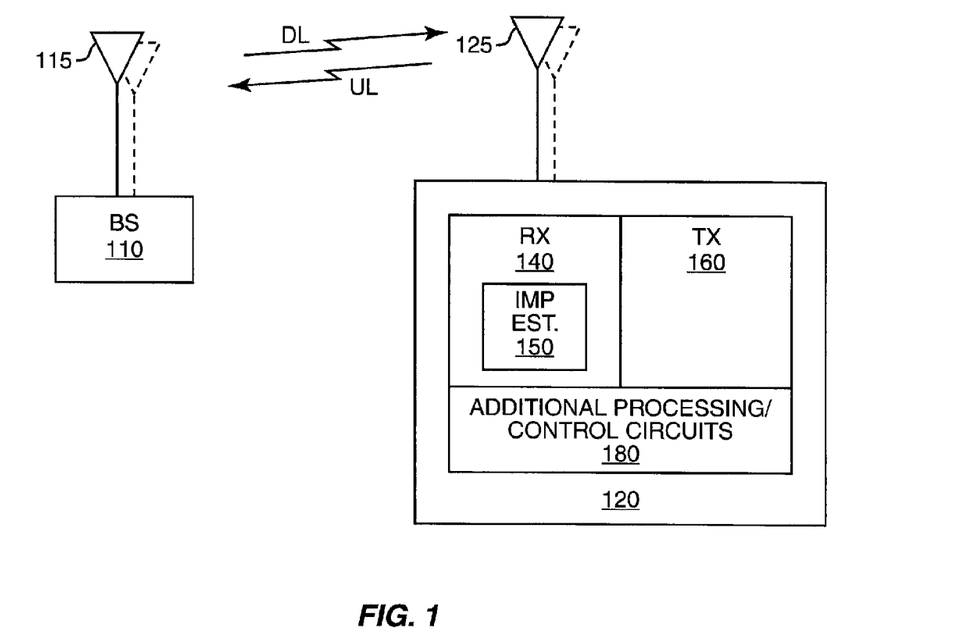
FIG. 1 is a block diagram illustrating an exemplary communication network base station and exemplary wireless communication device.

FIG. 1 provides a simplified depiction of a base station 110 transmitting signals on a downlink (DL) to wireless communication device 120, using one or more base station antennas 115. Wireless communication device 120 in turn transmits signals on an uplink (UL) to the base station 110, using one or more device antennas 125. Wireless communication device 120 includes a receiver circuit 140, a transmitter circuit 160, and one or more additional processing circuits 180, which will vary depending on the features and intended use of wireless device 120. Of particular interest for the purposes of the present disclosure, receiver circuit 140 includes an impairment estimation circuit 150 configured to determine received signal impairment correlations with a high degree of computational efficiency.

Figure 2:
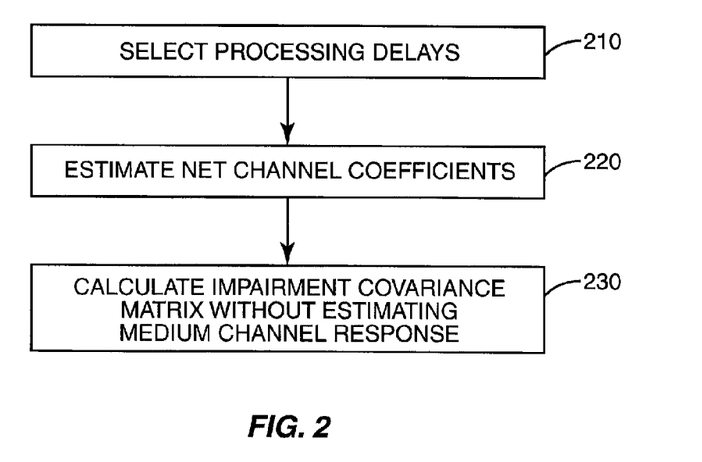
FIG. 2 is a logic flow diagram of one embodiment of processing logic for determining an impairment covariance matrix for use in an interference-suppressing CDMA receiver.

FIG. 2 illustrates one embodiment of impairment correlation estimation processing according to the present invention. According to the illustrated processing logic, one or more processing circuits in receiver 140, including impairment estimation circuit 150, are configured to determine an impairment covariance matrix for a plurality of delays of interest for a received CDMA signal. As will be described in more detail in the description that follows, a plurality of processing delays for processing the received CDMA signal are selected, as shown at block 210. A net channel coefficient for each of the processing delays is estimated, as shown at block 220; the net channel coefficient represents the end-to-end propagation channel response for the received CDMA signal, including the transmitter and receiver pulse-shaping filters. Finally, as shown at block 230, an impairment covariance matrix for the selected set of process delays is computed, based on the net channel coefficients. Using the techniques disclosed herein, the impairment covariance matrix may be computed without estimating the propagation medium channel response and without highly accurate knowledge of multipath channel delays.

Those skilled in the art will appreciate that in generalized Rake (G-Rake) implementations of the receiver circuit 140, the selected delays are G-Rake processing delays, or finger delays, which may be used to provide for interference suppression. Also, in chip equalization (CE) implementations of the receiver circuit 140, the selected delays are chip equalization processing delays or tap delays, which may be used to provide for interference suppression. The impairment covariance matrix computed according to the techniques disclosed herein may be used for combining weight generation, signal quality determination, etc.

Base station 110 may also include an embodiment of the receiver circuits discussed herein, for estimating uplink signal impairment correlations. For ease of discussion, the discussion that follows focuses on receiver processing at the wireless communication device 120. However, those skilled in the art will recognize that, in general, the methods and apparatus taught herein teach the estimation of received signal impairments based on the net channel response of a received signal. Such processing is applicable to uplink and downlink communications, and is applicable to a broad range of CDMA communication signal types and system types.

With that in mind, and by way of non-limiting examples, base station 110 may comprise part of a wireless communication network, such as a cellular communication network configured to operate according to Wideband Code Division Multiple Access (WCDMA) standards, or according to IS-2000 standards. As such, the wireless communication device 120 may comprise a cellular radiotelephone configured for WCDMA operation, IS-2000 operation, or operation according to another standard. In general, wireless communication device 120 may comprise any type of wireless communication terminal or circuit, such as a cellular phone, pager, PDA, laptop/palmtop computer, or network card therein.

In one or more embodiments of the wireless communication device 120, receiver circuit 140 comprises a parametric G-Rake receiver circuit, which may in turn comprise one or more processing circuits, implemented using electronic hardware, software, or any combination thereof, configured for parametric G-Rake operation. In one or more embodiments, at least a portion of the parametric G-Rake receiver circuit is implemented in a baseband processor, which may comprise one or more microprocessors, digital signal processors, ASICs, FPGAs, or other digital processing circuit, configured according to program instructions comprising one or more computer programs or functions.

Figure 3:
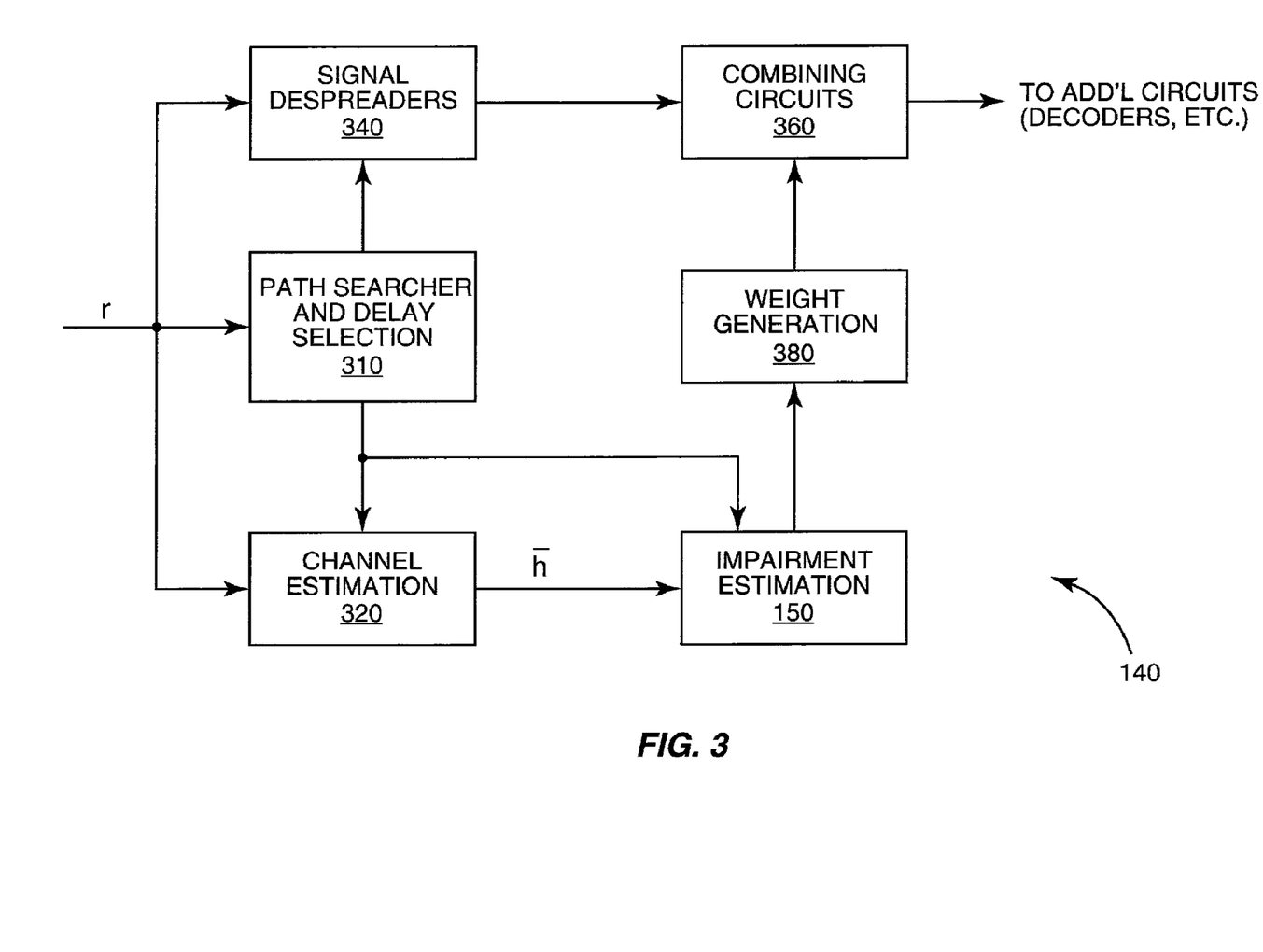
FIG. 3 is a block diagram of an exemplary receiver circuit configured for parametric G-Rake receiver operation.

With these variations for the various processing circuits of receiver circuit 140 in mind, a more detailed block diagram of one embodiment of a receiver circuit 140 is provided in FIG. 3. The G-Rake receiver embodiment of FIG. 3 comprises a path searcher/delay selection processor 310, a channel estimation circuit 320, signal de-spreaders 340, combining circuits 360, and a combining weight generation circuit 380. The G-Rake receiver of FIG. 3 also includes an embodiment of the earlier-illustrated impairment estimation circuit 150. In the pictured embodiment, impairment estimation circuit 150 is configured to calculate an impairment covariance matrix, representing the impairments to a received signal r, for the processing delays selected by delay selection circuit 310. The impairment covariance matrix calculated by impairment estimation circuit 150 may be used by weight generation circuit 380 to produce combining weights for processing de-spread received signal samples in combining circuit 360.

Thus, in one embodiment of receiver operation, receiver circuit 140 obtains digital baseband samples, r, of a received CDMA signal. The path searcher/delay selection circuit 310 performs rough correlation processing of the received baseband signal and generates a Power Delay Profile (PDP) or other information identifying the relative delays of the dominant multipath components of the received signal. As will be discussed in more detail below, path searcher/delay selection circuit 310 determines Rake finger placements, i.e., determines the delay time alignments to be used for received signal de-spreading and for interference characterization. These delays are used to place "fingers" of the Rake receivers; these fingers are used to process multiple versions of the received signal r at the selected delays. In some embodiments of the present invention, the resolution of the finger placement grid used for finger placement may define a "sub-chip" over-sampling rate of the received signal. For example, the finger placement grid, or "raster," may have a time resolution of ¼ of the received signal's "chip" time. However, in some embodiments of the invention the fingers may be placed using a raster having a spacing equal to the chip duration of the received signal.

Finger placement information drives operation of the channel estimation circuit 320, which, for purposes of this discussion, may be considered to include measurement or probing fingers that de-spread pilot symbols to obtain channel response information. More particularly, in at least one embodiment, channel estimation circuit 320 places measurement fingers on the processing delays so that net channel coefficients may be determined for each of the selected processing delays.

The signal de-spreaders 340 are aligned with the processing delays of interest. For example, each signal de-spreader is assigned a channelization code of interest and is time-aligned with the respective processing delay of interest. A given set of traffic de-spreaders may be assigned and aligned for each channelization code of interest. In turn, for each channelization code of interest, the combining circuits 360 combine the de-spread values from the fingers assigned to that code, according to combining weights generated by the combining weight generator circuit 380 in consideration of the received signal impairments, such that the combining weights suppress same-cell and other-cell interference in the resulting combined signal.

Using the techniques disclosed herein, receiver 140 may perform impairment estimation, based on estimates of the net channel response, without relying on knowledge of the underlying channel delays. While these estimates may be noisy, the estimates can be filtered to reduce the noise. Under some circumstances the estimation noise can be shown to be a less serious performance limitation than incorrect estimation of the channel delays.

In the discussion that follows, impairment estimation techniques are discussed in terms of a time-domain implementation. Those skilled in the art will appreciate that a frequency-domain implementation is also possible, and will be able to apply the discussed techniques to such an implementation. The following discussion also presents a general formulation for a two-by-two Multiple-Input Multiple Output (MIMO) system. The presented formulas cover single- and dual-stream MIMO scenarios as well as open- and closed-loop transmit diversity implementations. The presented scenarios provide generality without unnecessarily complicating the discussion; those skilled in the art will recognize that these formulas may be simplified to cover other multi-antenna scenarios.

Eq. (7), which provided one formulation for the entries of an impairment covariance matrix, may be reformulated in terms of the net channel coefficients, i.e., so that it does not depend on medium response coefficients. Assuming that other-cell interference is modeled as white noise, a general impairment covariance matrix structure can be written as:

$$R_u = \alpha_1 R_{I,1} \alpha_2 R_{I,2} + \alpha_X R_{I,X} + \beta R_n \quad \text{Eq. (10)}$$

There are several interference contributions in this formulation. There is an interference contribution from transmit antenna 1 ($R_{I,1}$), another from transmit antenna 2 ($R_{I,2}$), and, in the most general case, a cross-antenna contribution ($R_{I,X}$).

For this general case, the elements of the interference matrix can be written as:

$$R_{I,S}^{a_1 a_2}(d_1, d_2) = \sum_{m=-\infty}^{\infty} h_S^{a_1}(d_1 - mT_c)(h_S^{a_2}(d_2 - mT_c))^* - h_S^{a_1}(d_1)(h_S^{a_2}(d_2))^*. \quad \text{Eq. (11)}$$

In the above equation, a common set of processing delays ($d_j$) is used for fingers on all receive antennas. The subscript S can be 1, 2 or X, corresponding to the interference contribution from transmit antenna 1, transmit antenna 2, or the cross-antenna contribution, respectively. The superscripts $a_1$ and $a_2$ indicate which receive antenna the net channel coefficient corresponds to; in a two-branch receiver with two receive antennas these superscripts may take values of either 1 or 2.

Each interference matrix for multi-RX reception is given by:

$$R_{I,S} = \begin{bmatrix} R_{I,S}^{11} & R_{I,S}^{12} \\ (R_{I,S}^{12})^H & R_{I,S}^{22} \end{bmatrix}. \quad \text{Eq. (12)}$$

This formulation requires that three sub-matrices, $R_{I,S}^{11}$, $R_{I,S}^{22}$, and $R_{I,S}^{12}$, are calculated. Of these, two ($R_{I,S}^{11}$ and $R_{I,S}^{22}$) are conjugate symmetric, so that only the elements of the upper triangular portions of these matrices need to be computed.

Careful consideration of Eq. (11) reveals several implications. First, by focusing on the infinite summation it becomes apparent that measurements of net channel coefficients at chip-spaced intervals are needed. Even if it is assumed that the infinite summation in Eq. (11) can be truncated without too much degradation in receiver performance, if each delay difference $d_1 - d_2$ is not an integer number of chips then a direct implementation of Eq. (11) would require many more fingers than would generally be practical. Therefore, in one or more embodiments of a G-Rake receiver according to the present invention, finger placement is restricted to a chip-spaced raster, except for the case of a flat (one-tap, corresponding to a single delay) channel or substantially flat (dominant tap, corresponding to a single dominant delay, or low delay spread) channel. In some embodiments, finger placement may be based upon a simple fixed (contiguous) grid approach, such as the approach described in U.S. Patent Application Publication 2005/0047485, by Khayrallah et al., the contents of which are incorporated by reference herein. In others, a more complicated mirroring strategy (non-contiguous grid) may be employed, such as the approach described in U.S. Pat. No. 6,683,924, to Ottosson et al., issued Jan. 27, 2004 and incorporated by reference herein. In any event, those skilled will note that restricting finger placement to a chip-spaced raster does not meet the Nyquist criteria, and is therefore not theoretically optimum for W-CDMA. However, simulations for dispersive channels have shown little, if any, performance loss for such a receiver, compared to a G-Rake receiver with fingers on a Nyquist raster.

Given a chip-spaced raster, each of the interference matrix entries of Eq. (11) is actually a function of delay difference for the corresponding pair of fingers. To take advantage of this fact, Eq. (11) may be re-written as:

$$R_{I,S}{}^{a_1 a_2}(d_1, d_2) = K^{a_1 a_2}(\Delta) - h_S{}^{a_1}(d_1)(h_S{}^{a_2}(d_2))^*. \quad \text{Eq. (13)}$$

In this formulation, $K_S{}^{a_1 a_2}(\Delta)$ is an interference function given by:

$$K_S^{a_1 a_2}(\Delta) = \sum_{m=-\infty}^{\infty} h_S^{a_1}(\Delta - mT_c)(h_S^{a_2}(-mT_c))^*, \quad \text{Eq. (14)}$$

where $\Delta = d_1 - d_2$. Note that the (truncated) sum resembles convolution and can therefore be efficiently implemented as a convolution operation in either the time or frequency domain. Performing this operation once (for each antenna, and for any cross-antenna terms) will yield interference function values for all delay difference pairs. Thus, constructing any interference matrix element simply requires selecting the interference function value corresponding to the delay difference for that matrix element, and then subtracting the product of net channel coefficients for the associated delays.

Figure 4:
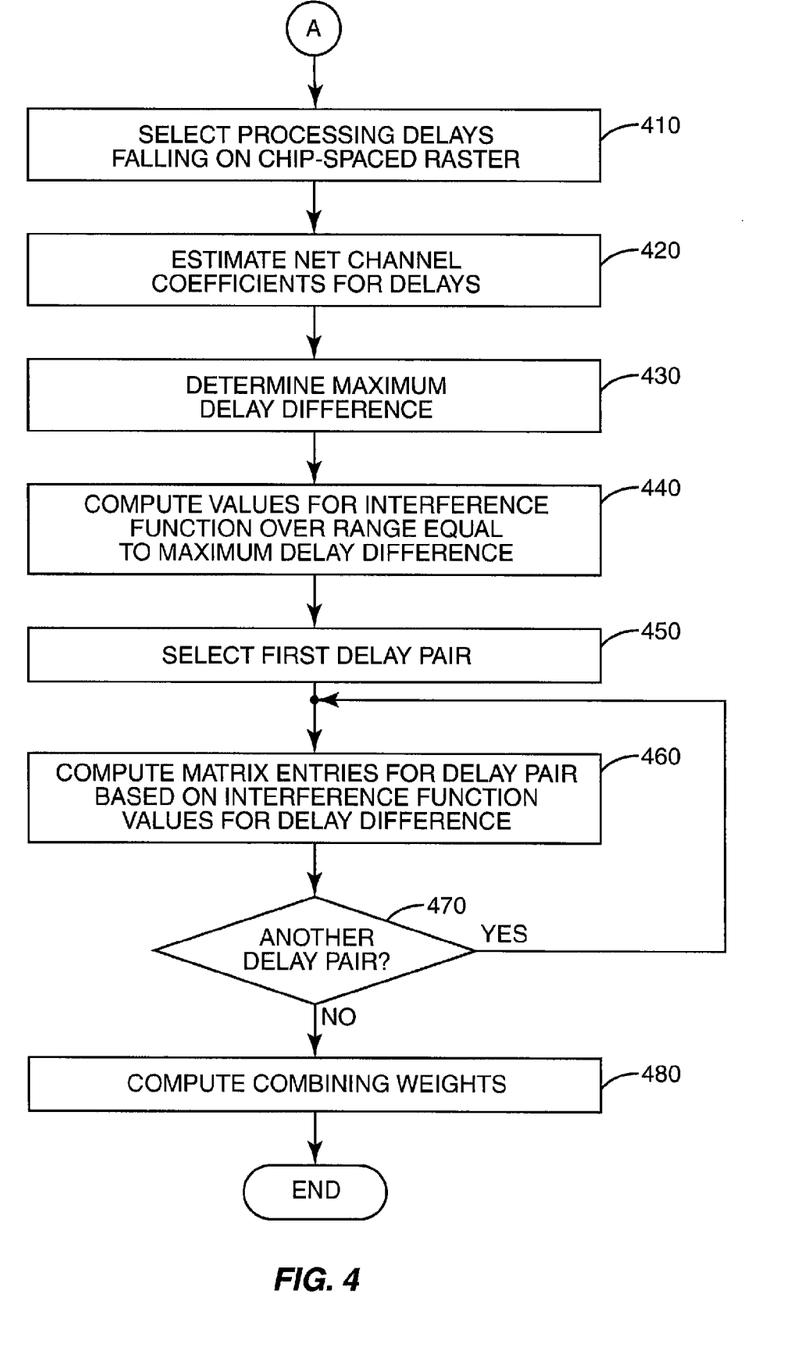
FIG. 4 is a logic flow diagram illustrating another embodiment of processing logic for determining an impairment covariance matrix.

FIG. 4 provides a logic flow diagram illustrating an exemplary procedure for determining an impairment covariance matrix for use in an interference-suppressing CDMA receiver according to some embodiments of the invention. To clarify the procedures, the method illustrated in FIG. 4 is explained in detail with respect to a Single-Input Multiple-Output (SIMO) system, i.e., a system employing one transmit antenna and two receive antennas. For this case, Eq. (10) simplifies to:

$$R_u = \alpha_1 R_I + \beta R_n, \quad \text{Eq. (15)}$$

and the subscript S can be ignored in Eq. (11)-Eq. (14). Those skilled in the art will appreciate that further simplifications occur in the case of a single-input single-output (SISO) system. In this case, $a_1 = a_2 = 1$, and the interference matrix is simply $R_I = R_I^{11}$.

In any event, the method of FIG. 4 begins at block 410 with the selection of a plurality of processing delays for processing the received CDMA signal, such that the processing delays fall on a chip-spaced raster. In other words, the delays are constrained so that the delay differences between any two of the processing delays is an integer multiple of a chip duration for the received CDMA signal. Delay information is obtained from a path searcher/delay estimator function, such as the path searcher 310 illustrated in FIG. 3; this delay information may be used in a G-Rake receiver to place a number N fingers on a chip-spaced raster. As discussed above, the fingers may be placed on a contiguous or non-contiguous grid.

At block 420, net channel coefficients are estimated for each of the delays. In the case of a SIMO system, net channel coefficients for both receive antennas ($\hat{h}^1$ and $\hat{h}^2$) may be estimated from the pilot channel. For example, net channel coefficients for the first receive antenna may be estimated according to:

$$\hat{h}^1 = \frac{1}{N_p} \sum_{k=0}^{N_p - 1} x_{pilot}^1(k) s^*(k), \quad \text{Eq. (16)}$$

where $x_{pilot}^1(k)$ is a vector of de-spread pilot symbols for antenna 1 and $s(k)$ is the known pilot symbol transmitted during the k-th symbol interval. Although not shown in FIG. 4, net channel coefficient estimates may be smoothed, i.e., filtered, across several time slots using, for instance, an exponential filter. For example, smoothed net channel coefficient estimates for antenna 1 at slot n may be obtained according to:

$$\tilde{h}^1(n) = \lambda \tilde{h}^1(n-1) + (1-\lambda)\hat{h}^1, \quad \text{Eq. (17)}$$

where $0 \leq \lambda \leq 1$). In some embodiments, filtering may be selectively applied. For instance, activation of the filtering may be controlled by the use of a Doppler spread frequency estimator. Thus, in some embodiments, if the Doppler spread frequency is low, filtering can be enabled. Alternatively, if the Doppler spread frequency is high, filtering can be disabled. In other embodiments, products of net channel coefficients are smoothed.

At block 430, the maximum delay difference between any two of the selected delays is determined. In some embodiments, it may be convenient to order the N finger delays from earliest in time to latest in time, i.e., $d_0 < d_1 < \ldots < d_{N-1}$, and to compute the maximum delay difference $\Delta_{max} = d_{N-1} - d_0$.

The maximum delay difference $\Delta_{max}$ is used to determine the range over which values for the interference function $K^{a_1 a_2}(\Delta)$ are calculated, as shown at block 440. Each value for the interference function may be calculated, over a range of $-\Delta_{max}$ to $\Delta_{max}$, using Eq. (14) and the estimated net channel coefficients $\hat{h}^1$ and $\hat{h}^2$. In an embodiment where a non-contiguous grid of fingers is used, a value of zero may be assumed for the net channel coefficient for any grid location without an actual finger assigned. For the SIMO embodiment, interference functions are needed for the following delay differences:

$$K^{11}(m) \forall m \in \{-\Delta_{max}, (-\Delta_{max}+1), \ldots, 0\}$$

$$K^{22}(m) \forall m \in \{-\Delta_{max}, (-\Delta_{max}+1), \ldots, 0\}, \text{ and}$$

$$K^{12}(m) \forall m \in \{-\Delta_{max}, (-\Delta_{max}+1), \ldots, \Delta_{max}\}.$$

Those skilled in the art will appreciate that the interference functions $K^{11}(m)$ and $K^{22}(m)$ are symmetric, so that values can be calculated for just the range $-\Delta_{max}$ to zero.

Entries for the interference sub-matrices $R_I^{11}$, $R_I^{22}$, and $R_I^{12}$ are calculated at blocks 450, 460, and 470. A first delay pair (e.g., $d_i, d_j$) is selected at block 450, and a matrix entry corresponding to that delay pair is calculated at block 460, using Eq. (13) and the interference function values computed at block 440. This is repeated for each delay pair in the matrix (and for each sub-matrix in the overall interference matrix) until it is determined (at block 470) that entries have been computed for all delay pairs.

In some embodiments, calculation of matrix entries for $R_I^{11}$ and $R_I^{22}$ may proceed according to the following algorithm, for processing delays indexed from zero to N−1:

(a) set i=0
(b) set j=i
(c) compute the delay difference $\Delta = d_i - d_j$
(d) let $R_I^{yy}(i,j) = K^{yy}(\Delta) - h^y(d_i)(h^y(d_j))^*$ and $R_I^{yy}(j,i) = (R_I^{yy}(i,j))^*$
(e) j=j+1
(f) if j<=N, return to step (c)
(g) i=i+1
(h) If i<=N, return to step (b).

Similarly, the interference sub-matrix $R_I^{12}$ may be computed according to:

(a) set i=0
(b) set j=0
(c) compute the delay difference $\Delta=d_i-d_j$
(d) let $R_I^{12}(i,j)=K^{12}(\Delta)-h^1(d_i)(h^2(d_j))^*$
(e) j=j+1
(f) if j<=N, return to step (c)
(g) i=i+1
(h) If i<=N, return to step (b).

$$\left[d_{flat}-T_c, d_{flat}-\frac{T_c}{2}, d_{flat}, d_{flat}+\frac{T_c}{2}, d_{flat}+T_c\right].$$

Those skilled in the art will appreciate that other approaches are possible and will generally follow the below description.

Consider the form of the interference matrix $R_{I,S}^{a_1 a_2}$. The entries of the upper triangular portion of this matrix are defined as:

$$R_{I,S}^{a_1 a_2} = \begin{bmatrix} R_S^{a_1 a_2}(-T_c,-T_c) & R_S^{a_1 a_2}\left(-T_c,-\frac{T_c}{2}\right) & R_S^{a_1 a_2}(-T_c,0) & R_S^{a_1 a_2}\left(-T_c,\frac{T_c}{2}\right) & R_S^{a_1 a_2}(-T_c,T_c) \\ & R_S^{a_1 a_2}\left(-\frac{T_c}{2c},-\frac{T_c}{2}\right) & R_S^{a_1 a_2}\left(-\frac{T_c}{2c},0\right) & R_S^{a_1 a_2}\left(-\frac{T_c}{2c},\frac{T_c}{2}\right) & R_S^{a_1 a_2}\left(-\frac{T_c}{2c},T_c\right) \\ & & R_S^{a_1 a_2}(0,0) & R_S^{a_1 a_2}\left(0,\frac{T_c}{2}\right) & R_S^{a_1 a_2}(0,T_c) \\ & & & R_S^{a_1 a_2}\left(\frac{T_c}{2c},\frac{T_c}{2}\right) & R_S^{a_1 a_2}\left(\frac{T_c}{2c},T_c\right) \\ & & & & R_S^{a_1 a_2}(T_c,T_c) \end{bmatrix} \quad \text{Eq. (18)}$$

The overall interference matrix can be computed from $R_I^{11}$, $R_I^{22}$, and $R_I^{12}$ as shown in Eq. (12). Processing of the received signal with the calculated impairment matrix may then proceed. In the exemplary method of FIG. 4, for example, processing proceeds with the calculation of combining weights from the impairment covariance matrix, e.g., according to Eq. (1). Those skilled in the art will appreciate that the impairment covariance matrix computed by the method illustrated in FIG. 4 may be used for other purposes as well, such as estimating a signal-to-noise-plus-interference ratio (SINR) for the received signal.

In most cases, the chip-spaced grid used in the method of FIG. 4 provides good performance, and facilitates computation of an impairment covariance matrix without precise knowledge of the underlying signal propagation delays. However, the cases of a flat channel, a channel with a dominant path, and a channel with mild dispersion (collectively referred to as substantially flat) are not handled well by a chip spaced grid if the delay information is incorrect. The delay information can be incorrect for a number of reasons, including the coarseness of delay reporting from the path searcher, timing drift, differences in overall group delay between receive chains in multi-antenna receivers, and imperfectly synchronized transmissions from two or more transmitters. If the propagation channel is substantially flat, delay inaccuracy may cause severe performance degradation, especially for scenarios where peak throughput is desired. Therefore, some embodiments of the present invention include a special processing mode that is activated when a substantially flat channel is detected. Such a channel can be detected when the searcher reports only one resolvable path or reports one path much larger than the rest or reports path delays that span a small delay spread (e.g., less than 2 chips).

In these embodiments, if the receiver detects a substantially flat channel, it uses a sub-chip spaced grid with M fingers per antenna centered on the reported delay $d_{flat}$. The impairment covariance matrix for this configuration may be computed using estimated net channel coefficients, again without any need to calculate a propagation medium channel response.

In the detailed discussion that follows, formulas are provided for the specific case of M=5 fingers per antenna, placed on a half-chip spaced grid, i.e., at If the summation of Eq. (11) is expanded for each of these entries, it quickly becomes clear that the interference matrix has a structure:

$$R_{I,S}^{a_1 a_2} = \begin{bmatrix} \rho_{11} & \rho_{12} & \rho_{13} & \rho_{14} & \rho_{15} \\ (\rho_{12})^* & \rho_{22} & \rho_{23} & \rho_{24} & \rho_{25} \\ (\rho_{13})^* & (\rho_{23})^* & \rho_{11} & \rho_{12} & \rho_{13} \\ (\rho_{14})^* & (\rho_{24})^* & (\rho_{12})^* & \rho_{22} & \rho_{23} \\ (\rho_{15})^* & (\rho_{25})^* & (\rho_{13})^* & (\rho_{23})^* & \rho_{11} \end{bmatrix} - h_S^{a_2}(h_S^{a_2})^H. \quad \text{Eq. (19)}$$

Here, there are only 9 unique matrix elements. These elements are given by:

$$\rho_{11} = h_S^{a_1}(d_{flat}-T_c)(h_S^{a_2}(d_{flat}-T_c))^* + \quad (20)$$
$$h_S^{a_1}(d_{flat})(h_S^{a_2}(d_{flat}))^* + h_S^{a_1}(d_{flat}+T_c)(h_S^{a_2}(d_{flat}+T_c))^*$$

$$\rho_{12} = h_S^{a_1}(d_{flat}-T_c)\left(h_S^{a_2}\left(d_{flat}-\frac{T_c}{2}\right)\right)^* + h_S^{a_1}(d_{flat})\left(h_S^{a_2}\left(d_{flat}+\frac{T_c}{2}\right)\right)^*$$

$$\rho_{13} = h_S^{a_1}(d_{flat}-T_c)(h_S^{a_2}(d_{flat}))^* + h_S^{a_1}(d_{flat})(h_S^{a_2}(d_{flat}+T_c))^*$$

$$\rho_{14} = h_S^{a_1}(d_{flat}-T_c)\left(h_S^{a_2}\left(d_{flat}+\frac{T_c}{2}\right)\right)^*$$

$$\rho_{15} = h_S^{a_1}(d_{flat}-T_c)(h_S^{a_2}(d_{flat}+T_c))^*$$

$$\rho_{22} =$$
$$h_S^{a_1}\left(d_{flat}-\frac{T_c}{2}\right)\left(h_S^{a_2}\left(d_{flat}-\frac{T_c}{2}\right)\right)^* + h_S^{a_1}\left(d_{flat}+\frac{T_c}{2}\right)\left(h_S^{a_2}\left(d_{flat}+\frac{T_c}{2}\right)\right)^*$$

$$\rho_{23} = h_S^{a_1}\left(d_{flat}-\frac{T_c}{2}\right)(h_S^{a_2}(d_{flat}))^* + h_S^{a_1}\left(d_{flat}+\frac{T_c}{2}\right)(h_S^{a_2}(d_{flat}+T_c))^*$$

$$\rho_{24} = h_S^{a_1}\left(d_{flat}-\frac{T_c}{2}\right)\left(h_S^{a_2}\left(d_{flat}+\frac{T_c}{2}\right)\right)^*$$

$$\rho_{25} = h_S^{a_1}\left(d_{flat}-\frac{T_c}{2}\right)(h_S^{a_2}(d_{flat}+T_c))^*$$

From Eq. (19) and Eq. (20), it becomes extremely straightforward to compute the interference matrices for a substantially flat channel.

Figure 5:
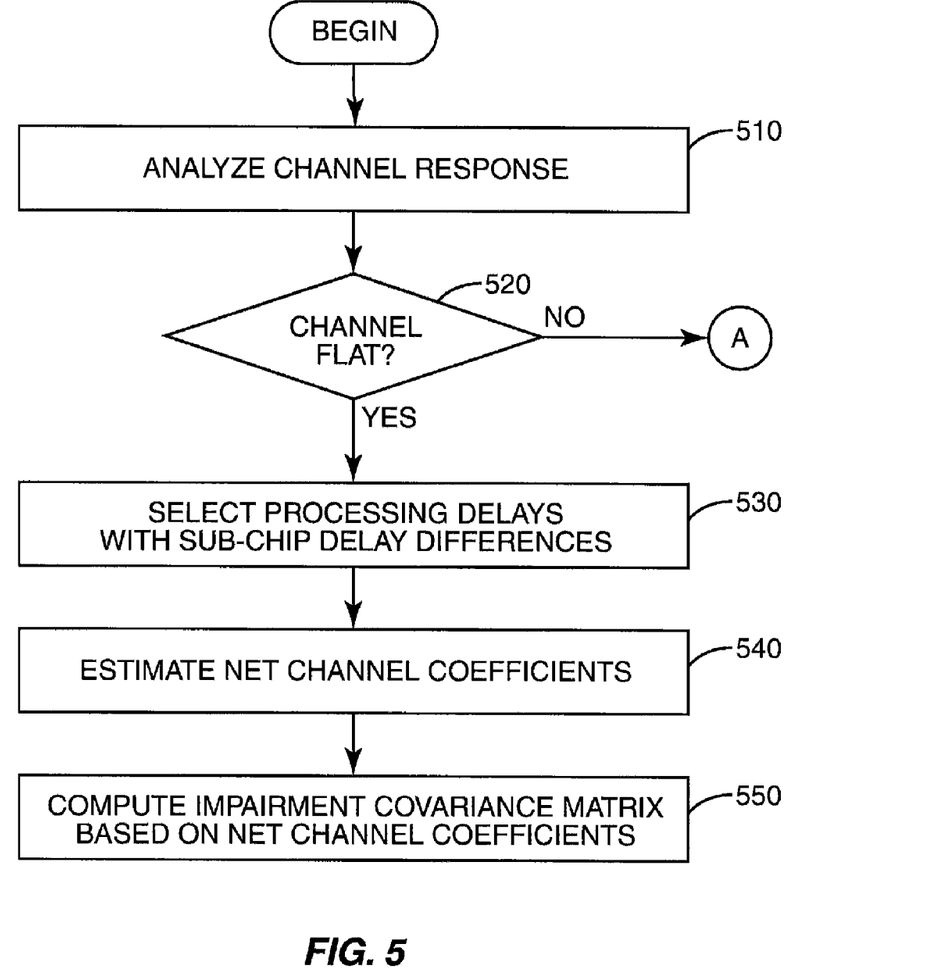
FIG. 5 is a logic flow diagram illustrating another embodiment of processing logic for determining an impairment covariance matrix.

A generalized method for determining an impairment covariance matrix that includes a flat-channel processing mode is illustrated in FIG. 5. The process begins at block 510 with an analysis of the channel response. For example, path search/delay estimation results may be obtained from the path searcher, and analyzed to determine whether the channel is substantially flat. If the channel is not substantially flat, as determined at block 520, then processing may proceed according to the method illustrated in FIG. 4. If the channel is substantially flat, however, the procedure continues at block 530, with the selection of M processing delays for each receiver antenna. The M processing delays are spaced at sub-chip delay differences, e.g., at half-chip spacing, centered on the reported delay for the flat channel.

At block 540, net channel coefficients are estimated for the processing delays. As discussed earlier, these estimates may be obtained from received pilot symbol data. In some embodiments, the net channel coefficient estimation process may include smoothing the net channel coefficients using, for example, an exponential filter. Finally, at block 550, an impairment covariance matrix is calculated, based on the estimated net channel coefficients. For the case of five fingers spaced at half-chip intervals, the formulas of Eq. (19) and Eq. (20) may be used to compute interference sub-matrices $R_{I,S}^{11}$, $R_{I,S}^{22}$, and $R_{I,S}^{12}$. These sub-matrices are then combined into interference matrix $R_{I,S}$ according to equation Eq. (12). For other cases, similar equations may be derived using the general approach described above.

While one or more of the above embodiments present G-Rake receiver circuit details, the methods and apparatus taught herein for efficient determination of impairment correlation estimates may be advantageously applied to other receiver types. By way of non-limiting example, receiver circuit 140 is, in one or more embodiments, configured as a chip equalizer. In such chip equalizer embodiments, the impairment covariance matrix may be generated according to the above teachings. In chip equalizer embodiments, the impairment correlation estimates may be used to form combining weights, also known as equalizer coefficients. The combining weights are applied to the chip samples prior to despreading. Thus, in one or more embodiments, the receiver circuit 140 comprises or includes a chip equalizer circuit that is configured to carry out one or more of the above-disclosed methods for determining impairment correlations between a plurality of delays of interest for a received CDMA signal.

The various receiver circuits 140 disclosed herein, whether comprising G-Rake receivers or chip equalizer circuits, thus include processing circuits configured to carry out one or more of the methods disclosed herein, which generally comprise selecting a plurality of processing delays for processing a received CDMA signal, estimating a net channel coefficient for each of the processing delays, and calculating an impairment covariance matrix for the processing delays. The impairment covariance matrix is calculated as a function of the estimated net channel coefficients and the processing delays, without estimating a propagation medium channel response for the received signal. In some embodiments, the processing delays are selected so that the delay difference between any two of the processing delays is an integer multiple of a chip duration for the received CDMA signal. In other embodiments, processing delays with sub-chip spacing are selected if the CDMA signal is received through a substantially flat propagation channel. In embodiments where processing delays are placed on a chip-spaced raster, the receiver processing circuits may be configured to calculate values for an interference function defined as a function of delay differences between processing delay pairs, over a range of delay differences at least equal to the maximum difference between any two of the processing delays. In these embodiments, calculating the impairment covariance matrix may comprise computing a matrix entry for a pair of processing delays as a function of the net channel coefficients for each of the pair and the interference function value corresponding to the delay difference between the pair. In some embodiments, it may be advantageous to calculate values for the interference function by executing a convolution operation in the time domain, or a corresponding operation in the frequency domain.

Of course, the present invention is not limited by the foregoing discussion, nor is it limited by the accompanying drawings. Indeed, the present invention is limited only by the following claims, and their legal equivalents.

What is claimed is:

1. A method of determining an impairment covariance matrix for use in an interference-suppressing CDMA receiver, comprising:
   selecting a plurality of processing delays for processing a received CDMA signal;
   estimating a net channel coefficient for each of the processing delays; and
   calculating an impairment covariance matrix for the processing delays as a function of the net channel coefficients and the processing delays without estimating a propagation medium channel response for the received signal.

2. The method of claim 1, wherein selecting a plurality of processing delays for processing a received CDMA signal comprises selecting the processing delays such that the delay difference between any two of the processing delays is an integer multiple of a chip duration for the received CDMA signal.

3. The method of claim 2, wherein calculating an impairment covariance matrix for the processing delays comprises computing one or more entries of the impairment covariance matrix as a function of the net channel coefficients for each of a pair of processing delays and the delay difference between the pair.

4. The method of claim 2, further comprising calculating values for an interference function defined as a function of delay differences over a range of delay differences, wherein calculating the impairment covariance matrix for the processing delays comprises computing a matrix entry for a pair of processing delays as a function of the net channel coefficients for each of the pair and the interference function value corresponding to the delay difference between the pair.

5. The method of claim 4, wherein calculating values for the interference function comprises executing a convolution operation using the net channel coefficients to obtain the interference function values, and storing the interference values for use in calculating the impairment covariance matrix.

6. The method of claim 5, wherein executing the convolution operation using the net channel coefficients comprises performing the convolution operation in the frequency domain.

7. The method of claim 1, wherein estimating a net channel coefficient for each of the processing delays comprises estimating the net channel coefficients as a function of received pilot symbols.

8. The method of claim 1, wherein estimating a net channel coefficient for each of the processing delays further comprises smoothing one of the net channel coefficients or products of net channel coefficients.

9. The method of claim 1, wherein estimating a net channel coefficient for each of the processing delays further comprises selectively smoothing the net channel coefficients responsive to a Doppler spread frequency estimate for the received CDMA signal exceeding a predetermined threshold.

10. The method of claim 1, further comprising determining whether the channel response for the received CDMA signal is substantially flat, wherein selecting a plurality of processing delays for processing a received CDMA signal comprises:
selecting the processing delays such that the delay difference between any two of the processing delays is an integer multiple of a chip duration for the received CDMA signal, responsive to the channel response being other than substantially flat; and
selecting the processing delays so that the delay difference between one or more pairs of the processing delays is less than the chip duration, responsive to the channel response being substantially flat;
wherein a substantially flat channel response is a channel response having a single dominant delay, a low delay spread, or both.

11. A receiver circuit for determining signal impairments for a received CDMA signal, the receiver circuit comprising one or more processing circuits configured to:
select a plurality of processing delays for processing the received CDMA signal;
estimate a net channel coefficient for each of the processing delays; and
calculate an impairment covariance matrix for the processing delays as a function of the net channel coefficients and the processing delays without estimating a propagation medium channel response for the received signal.

12. The receiver circuit of claim 11, wherein the one or more processing circuits are configured to select the plurality of processing delays for processing a received CDMA signal such that the delay difference between any two of the processing delays is an integer multiple of a chip duration for the received CDMA signal.

13. The receiver circuit of claim 12, wherein the one or more processing circuits are configured to calculate the impairment covariance matrix for the processing delays by computing one or more entries of the impairment covariance matrix as a function of the net channel coefficients for each of a pair of processing delays and the delay difference between the pair.

14. The receiver circuit of claim 12, wherein the one or more processing circuits are further configured to calculate values for an interference function defined as a function of delay differences over a range of delay differences, and to calculate the impairment covariance matrix for the processing delays by computing a matrix entry for a pair of processing delays as a function of the net channel coefficients for each of the pair and the interference function value corresponding to the delay difference between the pair.

15. The receiver circuit of claim 14, wherein the one or more processing circuits are configured to calculate values for the interference function by executing a convolution operation using the net channel coefficients to obtain the interference function values, and storing the interference values for use in calculating the impairment covariance matrix.

16. The receiver circuit of claim 15, wherein the one or more processing circuits are configured to execute the convolution operation by performing the convolution operation in the frequency domain.

17. The receiver circuit of claim 11, wherein the one or more processing circuits are configured to estimate the net channel coefficient for each of the processing delays as a function of received pilot symbols.

18. The receiver circuit of claim 11, wherein the one or more processing circuits are further configured to estimate the net channel coefficient for each of the processing delays by smoothing one of the net channel coefficients or products of net channel coefficients.

19. The receiver circuit of claim 11, wherein the one or more processing circuits are further configured to estimate the net channel coefficient for each of the processing delays by selectively smoothing the net channel coefficients responsive to a Doppler spread frequency estimate for the received CDMA signal exceeding a predetermined threshold.

20. The receiver circuit of claim 11, wherein the one or more processing circuits are further configured to determine whether the channel response for the received CDMA signal is substantially flat, wherein the one or more processing circuits are configured to select the plurality of processing delays for processing a received CDMA signal by:
selecting the processing delays such that the delay difference between any two of the processing delays is an integer multiple of a chip duration for the received CDMA signal, responsive to the channel response being other than substantially flat; and
selecting the processing delays so that the delay difference between one or more pairs of the processing delays is less than the chip duration, responsive to the channel response being substantially flat;
wherein a substantially flat channel response is a channel response having a single dominant delay, a low delay spread, or both.

21. A wireless communication network base station comprising a receiver circuit for determining signal impairments for a received CDMA signal, the receiver circuit comprising one or more processing circuits configured to:
select a plurality of processing delays for processing the received CDMA signal;
estimate a net channel coefficient for each of the processing delays; and
calculate an impairment covariance matrix for the processing delays as a function of the net channel coefficients and the processing delays without estimating a propagation medium channel response for the received signal.

22. A wireless communication user equipment comprising a receiver circuit for determining signal impairments for a received CDMA signal, the receiver circuit comprising one or more processing circuits configured to:
select a plurality of processing delays for processing the received CDMA signal;
estimate a net channel coefficient for each of the processing delays; and
calculate an impairment covariance matrix for the processing delays as a function of the net channel coefficients and the processing delays without estimating a propagation medium channel response for the received signal.

* * * * *

UNITED STATES PATENT AND TRADEMARK OFFICE
CERTIFICATE OF CORRECTION

PATENT NO. : 8,295,417 B2
APPLICATION NO. : 12/133636
DATED : October 23, 2012
INVENTOR(S) : Cairns et al.

It is certified that error appears in the above-identified patent and that said Letters Patent is hereby corrected as shown below:

In the Specifications:

In Column 8, Line 11, in Equation (10), delete "$\alpha_1 R_{I,1} \alpha_2 R_{I,2}$" and insert -- $\alpha_1 R_{I,1} + \alpha_2 R_{I,2}$ --, therefor.

In Column 9, Line 14, in Equation (13), delete "$= K^{\alpha_1 \alpha_2}(\Delta)$," and insert -- $= K_S^{\alpha_1 \alpha_2}(\Delta)$ --, therefor.

Signed and Sealed this
Eighteenth Day of June, 2013

Teresa Stanek Rea
*Acting Director of the United States Patent and Trademark Office*